United States Patent

[11] 3,588,233

| [72] | Inventor | Charles E. Lambert<br>Sandy, Utah |
|---|---|---|
| [21] | Appl. No. | 743,340 |
| [22] | Filed | July 9, 1968 |
| [45] | Patented | June 28, 1971 |
| [73] | Assignee | Visor Mirror Corp. |

[54] EXTENDABLE SUN VISOR MIRROR
4 Claims, 10 Drawing Figs.

[52] U.S. Cl. ................................................. 350/292,
248/475
[51] Int. Cl. ....................................................... G02b 5/08
[50] Field of Search ............................................ 132/83.5;
350/292, 288, 299, 300, 305, 306, 302; 312/224,
225, 226, 227; 248/476, 478, 480, 475

[56] References Cited
UNITED STATES PATENTS

| 1,957,847 | 5/1934 | Peters | 350/292 |
| 2,097,419 | 10/1937 | Schmidt | 248/475X |
| 2,578,096 | 12/1951 | Smith | 312/227 |
| 2,582,593 | 1/1952 | Kramer | 132/83.5X |
| 2,784,302 | 3/1957 | Golden | 312/227X |

FOREIGN PATENTS

| 595,085 | 11/1947 | Great Britain | 132/83.5 |

*Primary Examiner*—David Schonberg
*Assistant Examiner*—John W. Leonard
*Attorneys*—Clarence A. O'Brien and Harvey B. Jacobson ABSTRACT: A mirror construction including a mounting clip structure for removably clipping the mirror construction to a pivoted sun visor of an automobile with the mirror overlying that side of the sun visor facing the inside of the automobile when the sun visor is in the lowered position, the mirror construction including a supplemental or extendable mirror section telescopingly received therein and extendable from the edge portion thereof corresponding to the free edge portion of the associated sun visor and releasably retainable in extended position for increased mirror viewing of a person not driving the associated vehicle.

Charles E. Lambert
INVENTOR

PATENTED JUN28 1971
3,588,233
SHEET 2 OF 3
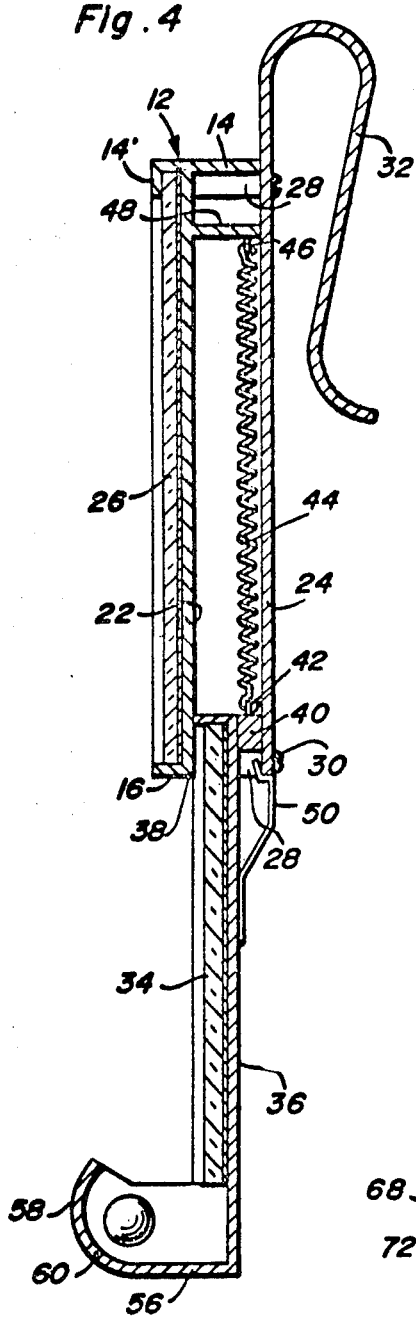
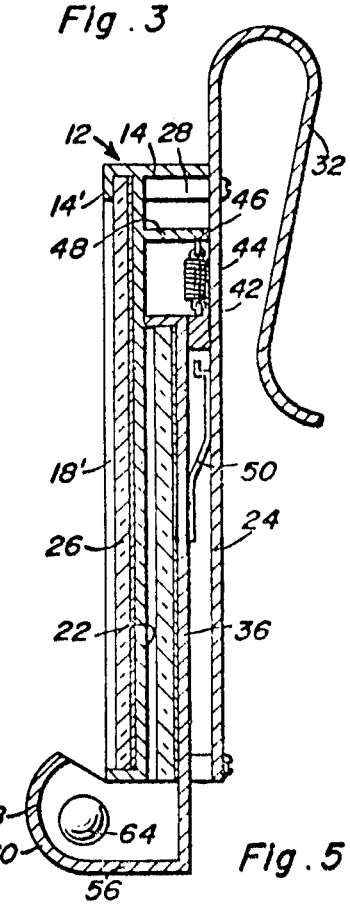
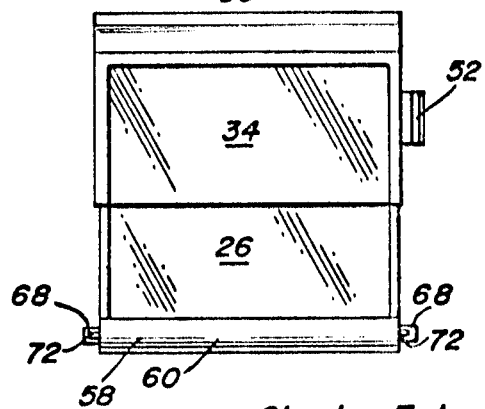
Charles E. Lambert
INVENTOR.
BY *Clarence A. O'Brien*
and *Harvey B. Jacobson*
Attorneys

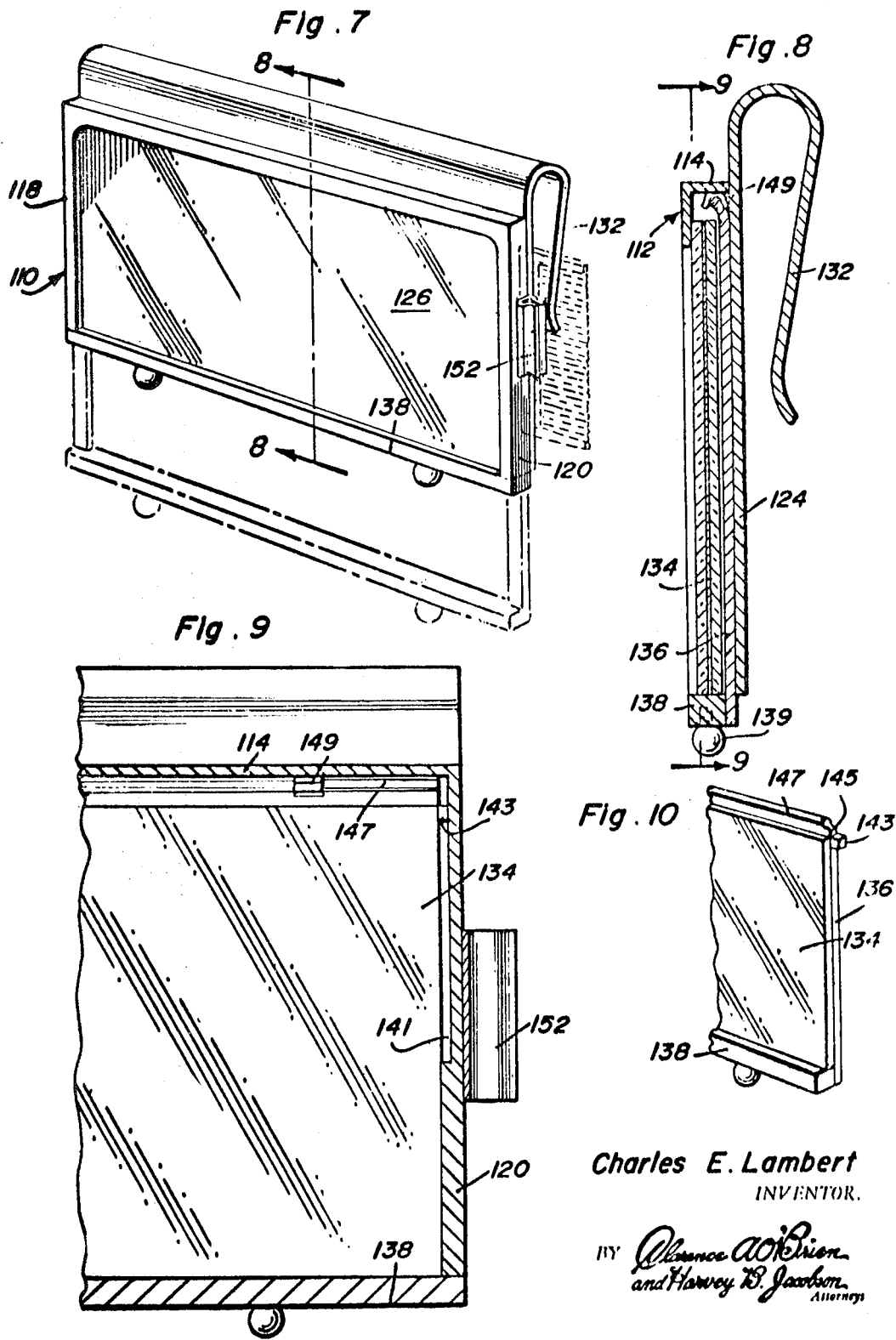

EXTENDABLE SUN VISOR MIRROR

The mirror construction of the instant invention is constructed in a manner whereby it may be readily removably attached to existing vehicle sun visors and includes an extendable mirror section which may be extended in order to provide a larger mirror surface than that which is afforded when the extendable mirror is in a collapsed position and the mirror assembly overlies but does not project appreciably beyond the corresponding marginal edge portions of the associated sun visor.

With the advent of extended vehicle travel persons in vehicles more often find the need for a mirror larger than pocket size and mirrors which are somewhat larger than pocket size and may be removably supported from a vehicle sun visor. Although conventional sun visor mirrors may be utilized by persons arranging themselves for better personal appearance after an extended motor vehicle trip, even the conventional sun visor mounted mirrors (which are appreciably larger than pocket mirrors) require a person using the mirror to shift his head as well as other body portions into and out of various positions for better viewing in the limited mirror surface of conventional sun visor mounted mirrors. Further, sun visor mounted mirrors are far too small for effective use by persons seated in the rear seats of motor vehicles without removing the sun visor mirror from the sun visor. Of course, vehicle sun visors inherently collect dust and dirt and many persons attempting to remove a sun visor mounted mirror for use by persons in the rear seat of an associated vehicle have found this task objectionable due to the dirt which usually collects on sun visors, and particularly the sides thereof upon which mirrors are conventionally mounted.

It is therefore the main object of this invention to provide a sun visor mounted mirror including a fully retractable and extendable mirror section for at least substantially doubling the effective mirror size when desired. With this type of mirror construction a person disposed in the front seat of the associated vehicle finds no need to shift his head or other body portions for better viewing and even persons seated in the rear of the associated vehicle may readily use the double-size mirror without its removal from its supporting sun visor.

Still another object of this invention is to provide an expandable or extendable mirror construction in accordance with the preceding object and including means by which it may be readily removably attached to substantially all sun visors.

A further object of this invention is to provide a sun visor mirror construction in accordance with the preceding objects and including selectively actuatable illumination means whereby sufficient illumination for viewing one's self in the mirror construction may be provided even in darkened areas.

Yet another object of this invention is to provide a mirror construction including clip means thereon whereby a hair comb may be readily removably supported therefrom.

A final object of this invention to be specifically enumerated herein is to provide a mirror construction in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals referred to like parts throughout, and in which:

FIG. 3 is an enlarged vertical sectional view taken substantially upon the plane indicated by the section line 3-3 of FIG. 1;

FIG. 4 is a vertical sectional view similar to that of FIG. 3 but illustrating the extendable mirror section in an extended position;

FIG. 5 is a front elevational view of the mirror construction with the extendable mirror section extended;

FIG. 7 is a perspective view similar to that of FIG. 1 but of a second form of mirror construction;

FIG. 8 is an enlarged vertical sectional view taken substantially upon the plane indicated by the section line 8-8 of FIG. 7;

Figure 1:
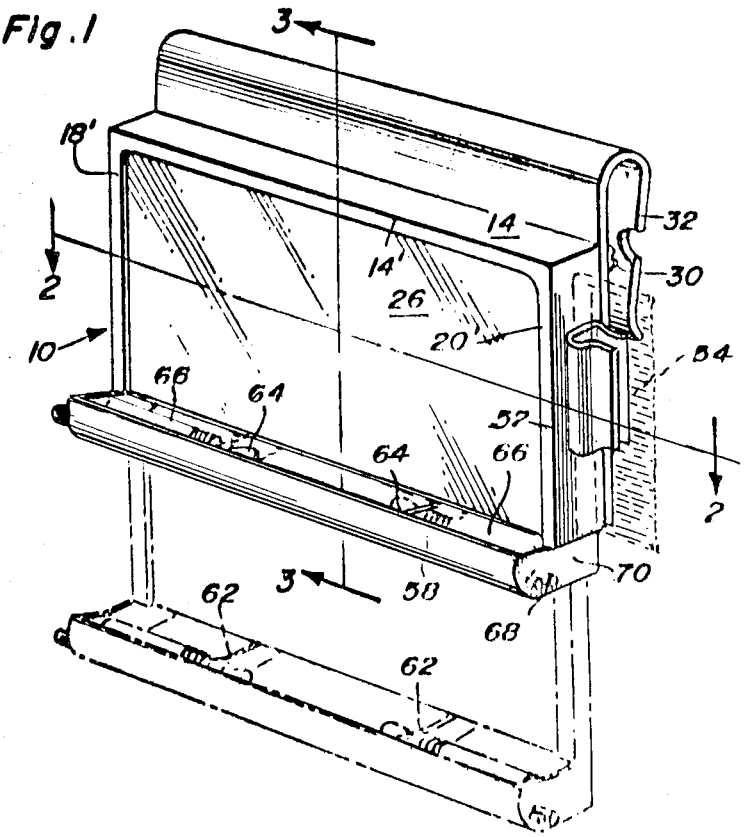
FIG. 1 is a perspective view of one form of the mirror construction of the instant invention with the extendable mirror section thereof illustrated in retracted position in solid lines and extended position in phantom lines.
Figure 2:
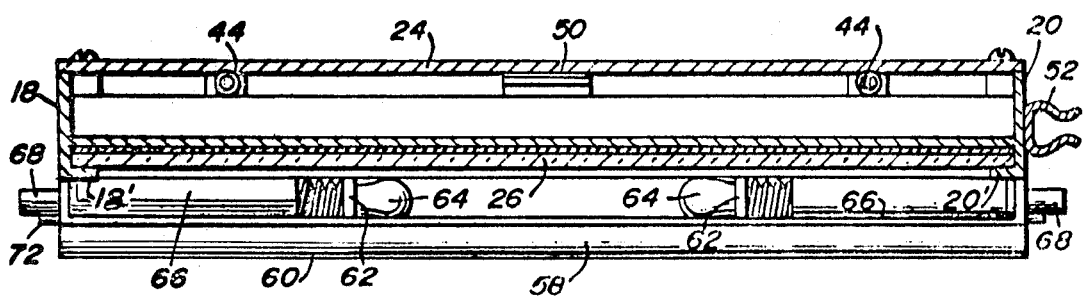
FIG. 2 is an enlarged horizontal sectional view taken substantially upon the plane indicated by the section line 2-2 of FIG. 1.
Figure 6:
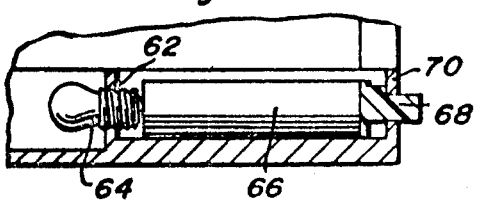
FIG. 6 is a fragmentary enlarged vertical sectional view illustrating the actuator for one of the illumination means in the actuated position.

FIG. 9 is a vertical sectional view taken substantially upon the plane indicated by the section line 9-9 of FIG. 8; and FIG. 10 is a fragmentary perspective view of the extendable mirror section of the second form of mirror construction illustrated in FIGS. 7—9. Referring now more specifically to the drawings the numeral 10 generally designates a first form of extendable sun visor mirror constructed in accordance with the present invention. The mirror 10 includes a housing referred to in general by the reference numeral 12 and including a top wall 14, a bottom wall 16, opposite sidewalls 18 and 20, a front wall 22 and a removable rear wall 24.

The top and bottom walls 14 and 16 as well as the opposite sidewalls 18 and 20 project forwardly of the front wall 22 so as to define a recess in which a first rectangular mirror section 26 is received. Further, the opposite sidewalls 18 and 20 and the top wall 14 include angulated flange portions 18', 20' and 14' which project inwardly over the corresponding marginal edge portions of the mirror section 26 to retain the latter in position in overlying relation to the outer surface of the front wall 22.

In each of the four corner portions of the housing 12 there is defined a mounting boss 28 and a plurality of removable fasteners 30 are utilized to secure the rear wall 24 over the open rear end of the housing 12, the fasteners 30 being secured through suitable openings (not shown) formed through the rear wall 24 and in the mounting boss portions 28. Further, the upper marginal edge portion of the rear wall 24 projects upwardly above the housing 12 and curves smoothly back upon itself to form a spring clip portion 32 by which the housing 12 may be readily clipped to and supported from a motor vehicle sun visor in a manner which is believed to be obvious.

A second mirror section 34 is provided and secured over the front face of an extendable panel member 36. The bottom wall 16 terminates rearwardly a spaced distance forward of the rear wall 24 so as to define an opening 38 in the bottom of the housing 26 in which the extendable mirror assembly comprising the mirror section 34 and the panel member 36 may be retracted. The upper marginal edge portion of the extendable mirror assembly includes a rearwardly projecting mounting boss portion 40 snugly received within the housing 12 and whose opposite ends project slightly beyond the opposite end edges of the mounting panel 36 for abutment with the upper portions of the opposite side lower mounting boss portions 28 whereby complete extension of the extendable mirror assembly through the opening 38 is prevented. In addition, the mounting boss portion 40 includes an anchor member 42 to which the lower end of an expansion spring 44 is secured and the upper end of the expansion spring 44 is secured to a second anchor member 46 carried by a partition 48 in the upper portion of the housing 12.

The center area of the panel member 36 includes a spring clip 50 which is automatically engageable with the lower marginal edge of the rear wall 24 when the extendable mirror assembly is in its fully lowered position illustrated in FIG. 4 of the drawings so as to prevent upward movement of the extendable mirror assembly into the housing 12 and the spring clip 50 may be readily depressed forwardly toward the rear surface of the panel member 36 so as to be received within the housing 12 forwardly of the rear wall 24 when it is desired to have the extendable mirror assembly retracted into the housing 12 by the expansion spring 44.

The sidewall 20 is provided with an exteriorly mounted spring clip 52 whereby a hair comb 54 may be supported from the exterior of the housing 12 and the lower marginal edge portion of the panel member 36 includes a forwardly projecting flange 56 whose forward end curves upwardly and rearwardly as at 58 to define an upwardly and rearwardly opening partial housing structure 60 disposed forwardly of and below the lower marginal edge portion of the mirror section 34. A pair of baffle walls 62 are provided through which a pair of flashlight bulbs 64 are threaded and a pair of flashlight batteries 66 are disposed in the opposite ends of the section 60 outwardly of the partitions 62 and have actuators 68 operatively associated therewith which project through opposite end wall portions 70 of the section 60 for shifting the adjacent ends of the batteries 66 into contact with the associated flashlight bulbs 64. The actuators 68 are slidably received through the end wall portions 70 and include radially projecting and longitudinally extending portions 72 which are displaceable inwardly of the end wall portions 70 and rotatable with the actuator 68 so as to be locked inwardly of the end wall portions 70 in position with the associated batteries 66 urged into engagement with the flashlight bulbs 64. Of course, if desired, the actuators 68 may be of the conventional pushbutton type devoid of means whereby they may be releasably retained in actuated positions.

In operation, the housing 12 may be clipped to a supporting sun visor in a manner which is believed to be obvious and the sun visor may be used in the conventional manner while the extendable mirror assembly comprising the mirror section 34 and the panel member 36 is retained in the retracted position illustrated in FIG. 3 of the drawings. Then, should a person wish to use the mirror section 34, the extendable mirror assembly may be merely grasped and pulled downwardly until the free end portion of the spring clip 50 is engaged with the lower edge surface of the rear wall 24. Thereafter, the user of the sun visor mirror 10 may actuate either one or both of the bulbs 64 and remove the comb 54 from the spring clip 52, if it is desired to use the comb 54. Of course, as soon as the mirror section 34 has been used and there is no need to maintain the extendable mirror assembly in the lowered position, the spring clip 50 may be engaged and pressed forwardly so as to release the spring clip 50 from engagement with the lower edge portion of the rear wall 24 and allow the expansion spring 44 to pull the extendable mirror assembly up into the housing 12.

With attention now invited more specifically to FIGS. 7—10 of the drawings there may be seen a sun visor mirror generally referred to by the reference numeral 110 and which is very similar to the mirror 10 and has the various components thereof corresponding to similar components of the mirror 10 designated by similar reference numerals in the 100 series.

The sun visor mirror 110 differs from the mirror 10 in that the backwall 124 of the housing 112 is bonded to the upper wall 114 and the opposite sidewalls 118 and 120. In addition, the extendable mirror section 134 supported from the panel member 136 includes a lower transverse member 138 which is secured to the panel member 136 in any convenient manner and may also be secured to the mirror section 134. The member 138 includes a pair of opposite end depending supported pull knobs 139 which may be engaged by the user of the extendable rear vision mirror 110 to lower the extendable mirror section 134. Further, the opposite sidewalls 118 and 120 include upstanding grooves 141 formed therein in which endwise outwardly projecting followers 143 carried by the upper portions of the opposite end edges of the panel member 136 are received. The followers 134 bottom in the lower ends of the upstanding grooves 141 so as to limit downward shifting of the extendable mirror assembly comprising the mirror section 134 and the panel member 136 and the upper marginal edge portion of the panel member 136 includes a forwardly and upwardly inclined extension 145 terminating upwardly in a bulbous rib 147 engageable by a plurality of spring clips 149 anchored to the undersurface of the top wall 114. Accordingly, it may be seen that engagement of the rib 147 with the spring clips 149 will serve to releasably retain the extendable mirror assembly consisting of the mirror section 134 and the panel member 136 in its fully retracted position.

The various housing portions of the extendable mirrors 10 and 110 may be readily constructed from suitable plastic sheet material and the illumination means comprising the flashlight bulbs 64 may be eliminated if desired. Further, it is to be understood that the extendable sun visor mirrors 10 and 110 are designed specifically for use with sun visors which are pivotally supported from the associated vehicle for rotation about horizontal axes. In addition, it is also of benefit if the sun visors are also supported for rotation about vertical axes whereby when the extendable sun visor mirrors 10 and 110 are in use they may be angularly shifted about vertical axes for use by persons in the rear seat area of the associated vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

I claim:

1. A mirror construction comprising a housing including spaced front and rear sides, said housing including a third side extending between said front and rear sides and having an opening formed therethrough opening into the interior of said housing, a first mirror element comprising at least a major portion of said front side of said housing, a second mirror element extendable and retractable relative to said housing through said opening between a retracted position at least substantially disposed in said housing between said front and rear sides and an extended position with said second mirror element projecting outwardly through said opening and forming a substantial extension of said first mirror element, said second mirror element when extended, generally paralleling and being spaced closely adjacent the plane in which said first mirror element is disposed, said housing including a U-shaped clip disposed outwardly of said rear side and opening toward said third side for clamping engagement with an associated sun visor, said second mirror element and said housing including first coacting means limiting extension of said second mirror element relative to said housing and second coacting means operative to releasably retain said second mirror element in retracted position relative to said housing.

2. The combination of claim 1 wherein the edge portion of said first mirror element relative to which the second element is extendable terminates outwardly along a line defining the outermost edge of said housing which overlies the front face of said second mirror element when the latter is extended, whereby the two mirror elements may be used simultaneously without vertical separation of the reflective surfaces of said mirror elements.

3. The combination of claim 1 including an outer marginal frame portion stationarily supported relative to the outer marginal edge portion stationarily supported relative to the outer marginal edge portion of said second mirror element said frame portion defining an area disposed outwardly of the front side of said second mirror element and which opens forwardly and upwardly toward the latter, said area having selectively actuatable illumination means disposed therein operative to cast light upwardly and upon the front side of said second mirror element.

4. The combination of claim 1 including means yieldingly urging said second mirror element toward a retracted position.